METHOD FOR MANUFACTURING PIEZOELECTRIC CRYSTALS FREE
OF CONFLICTING MODES OF VIBRATION
Filed Jan. 11, 1947
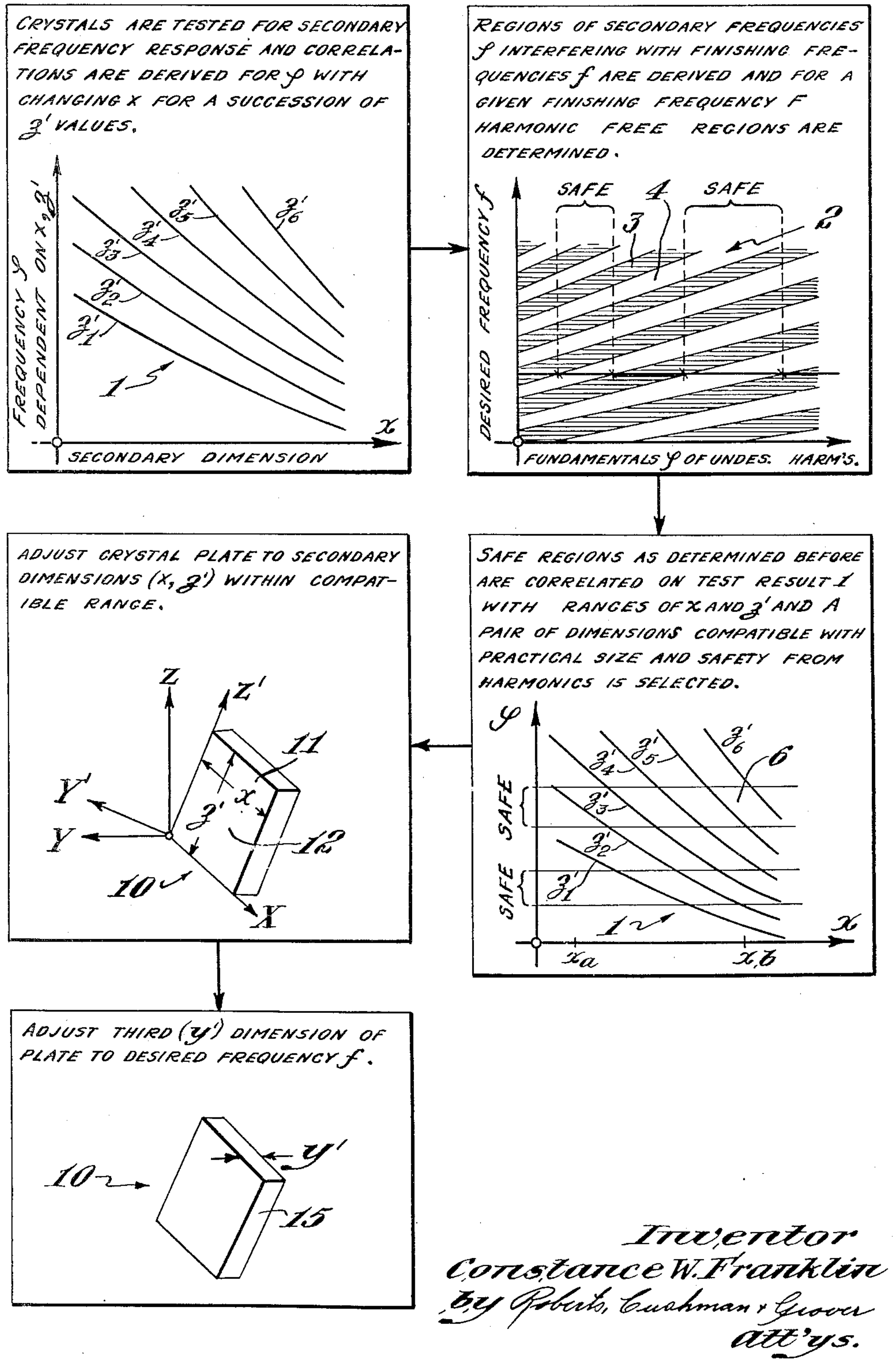
Inventor
Constance W. Franklin
by Roberts, Cushman & Grover
att'ys.

Patented Nov. 6, 1951 2,574,257

UNITED STATES PATENT OFFICE 2,574,257

METHOD FOR MANUFACTURING PIEZOELECTRIC CRYSTALS FREE OF CONFLICTING MODES OF VIBRATION

Constance W. Franklin, Belmont, Mass., assignor to Cambridge Thermionic Corporation, Cambridge, Mass., a corporation of Massachusetts Application January 11, 1947, Serial No. 721,509

2 Claims. (Cl. 171—327)

The present invention relates to the manufacture of piezoelectric crystals, particularly of the type which for purposes of temperature compensation are oriented about one of the principal axes of the crystal.

The finishing of crystals of the above mentioned type is often rendered difficult because at times the reduction of the frequency controlling dimension does not seem to be properly correlated with the corresponding resonant frequency in the neighborhood of the desired frequency assigned to the finished crystal. For example, low frequency AT-cut crystals whose characteristic mode is governed by the thickness of the crystal, are usually brought to frequency by machine lapping them to within a reasonably close kilocycle value of the desired frequency, whereafter they are hand lapped and etched to final requirements. Frequently, however, a crystal of good activity below (for example 10 kilocycles) its assigned working frequency abruptly loses activity. The operator, after proceeding progressively with repeated lappings, suddenly notes, in response to very slight lapping adjustment of the thickness, frequency jumps of such a magnitude that it is no longer possible to finish the crystal as intended.

By way of analysis with tuned oscillator apparatus, it is found that crystals which are oriented about a characteristic axis always have more than one resonant frequency. An AT crystal for example has its primary or working frequency $f$ which is governed by the primary or thickness dimension of the crystal in the $y'$ direction, and in addition low frequencies $\varphi$ which are little affected by changes in thickness, but quite sensitive to changes in the secondary or face dimensions in the $x$ and $z'$ directions. The frequencies $\varphi$ are capable of distorting the fundamental characteristics of the crystal, for example of delaying the expected increase of the $f$ frequency with reduction of the thickness of an AT crystal as above discussed. Analysis shows that whenever an harmonic of a $\varphi$ lies too near $f$, it pulls $f$ in its own direction, thus altering the frequency constant and in general lessening the activity of the crystal. As $f$ passes through one of these harmonics of $\varphi$ during the process of finishing the crystal plate, it is at first too high for its thickness as compared with the theoretically expected value, and then too low. Thus, it passes through a region of indefinite or unsteady correlation between thickness and working frequency, within which region it is little or not at all affected by adjustment of the primary dimension, in the case of an AT crystal, the thickness in the $y'$ direction. The operator usually reacts to this phenomenon by reducing the thickness more energetically which eventually results in the crystal becoming sufficiently thin so that it is no longer affected by the harmonics of $\varphi$ and so that it asserts a vigorous primary frequency which, however, by that time has passed the desired value without the latter having ever actually occurred.

Even if continuous finishing is possible in certain instances, the activity and temperature-frequency characteristics of the crystal are apt to be undesirable on the border of the above described region of uncertain response due to the harmonics of the secondary frequency.

In addition to the above discussed secondary frequency $\varphi$, there are certain other frequencies which are in most cases too weak to give a recognizable signal but which occasionally intrude when they lie only a few kilocycles away from the fundamental frequency $f$. These tertiary frequencies can usually be eliminated by a moderate amount of etching and present no unsurmountable difficulty.

It is accordingly one of the main objects of the present invention to fabricate a piezoelectric crystal element, such as an AT-cut quartz plate in such a fashion that a predictable and definite relation between the frequency determining or primary thickness, such as the $y'$ dimension in the case of an AT-cut crystal, and the resonant working frequency is maintained throughout the manufacturing process. Other objects are to provide a manufacturing technique for making AT-cut crystals of such secondary or face dimensions as to eliminate the above discussed uncertainty during manufacture; and to provide a manufacturing technique for such crystals which can be successfully executed by unskilled operators, which will always work with the desired certainty and which in its practical application does not necessitate elaborate manufacturing tools and testing steps, it being possible to determine this technique once and for all for each typical crystal cut.

In one aspect of the invention, the fabricating method according to the invention accomplishes these objects by experimentally determining the inter-relation between the fundamental frequency of the above mentioned conflicting harmonic frequencies and the secondary dimensions for a crystal element of predetermined orientation, adjusting a plate of that orientation to these secondary dimensions so that conflicting harmonics that lie within a predetermined range of a desired working frequency are excluded, and then adjusting the plate to the dimension furnishing the working frequency.

In another aspect, the method according to the invention includes the steps of testing a crystal plate of given orientation for response to secondary dimensions, the determination of the relationship between the desired frequency and undesirable harmonics which are dependent upon such secondary dimensions, the selection of a secondary dimension range which is compatible as to secondary harmonics with the desired working frequency, the adjustment of the crystal plate to secondary dimensions within the above compatibility range, and finally the adjustment of the primary dimension of the plate to the desired working frequency.

In a further aspect, the invention deals with a method of fabricating a piezoelectric quartz crystal plate of the AT-cut type intended to furnish a given resonant working frequency determined by the thickness in the direction of the derived mechanical axis and unaffected by conflicting harmonic frequencies dependent upon the plate dimensions in the electrical and derived optic axes, by experimentally determining the inter-relation between the fundamental frequency of the conflicting harmonic frequencies and the dimensions in the electrical and derived optic axes for a crystal of the orientation type of AT-cut selected, working a crystal plate of this cut to dimensions in the electrical and optic axes which dimensions preclude conflicting harmonics within a predetermined range of the desired working frequency, and then reducing the plate to the thickness furnishing the working frequency.

It is an additional particular feature of my invention to separate preliminary calibration of the crystal of a given type, so far as the secondary dimensions are concerned, as a laboratory operation carried out once and for all for this particular type or cut, from the calibration proper and to provide the operator with data derived from this laboratory step enabling him to work as if the above difficulties of positive correlation between primary dimension and working frequency were non-existent.

It should be understood that my manufacturing technique is applicable not only to the above specifically referred to crystals derived by orientation about the $x$ axis, but is applicable to any related problem arising from the uncertain response of an axis oriented crystal plate, as caused by frequencies or harmonics thereof which depend on dimensions other than those which are used for gradually adjusting the crystal to dimensions corresponding to the desired working resonant frequency.

These and other objects, aspects and features will appear from the following description of a typical practical embodiment illustrating the novel characteristics of my invention. This description refers to a drawing which is a flow diagram of the fabricating method according to the invention.

In order to determine the response of a crystal plate of the cut in question to secondary dimensions, a series of experimental plates is prepared and tested as follows.

For purposes of the embodiment herein described by way of example, a series of AT-cut blanks of .075″ thickness in the derived mechanical ($y'$) axis direction may be prepared, the plates of that series having uniform electrical axis dimensions ($x$) of 0.875″ and optic dimensions ($z'$) varying between 0.875″ and 0.5″, in steps of .025″. In the present example an angle $\theta$ of 35° 20′ degree was used. With the aid of proper tools, such as a steel right angle and a diamond wheel, the $x$ dimensions of one plate after another are then stepwise reduced by approximately .025″, the operator being careful to maintain rectangularity as he progresses. After each reduction of the $x$ dimension of a plate, the frequency $\varphi$ is plotted. This is repeated for each plate of the series of stepped $z'$ dimensions. It appears that the secondary frequency $\varphi$ is very little affected by thickness ($y'$) changes, so that smooth predictable curves were obtained in this preliminary manufacturing step, this family of curves being of the type indicated in the drawing by numeral 1.

Curve families of this type were repeatedly checked for various orientations and ranges of desired frequency, and it appeared that these key curves are unchanged in location by thickness changes and are smoothly distributed so that it is safe to assume that intermediate curves also correspond to each other in location. This circumstance permits the use, for all working frequencies $f$, of one curve family of $\varphi$ frequencies, in finishing crystals of the cut or orientation for which this curve family was determined.

It will be understood that instead of drawing a family $z_1'$, $z_2'$, $z_3'$ . . . of $z'$ curves for varying $x$ dimensions, families of $x$ curves for varying $z'$ dimensions might be drawn. Indeed, either type of dimensioning chart has been used and the principle involved was found to be applicable to all practical crystal plates of the derived types.

For the next step of relating the undesirable harmonics which are dependent upon secondary dimensions, to the desired working frequencies, a chart shown at 2 of the drawing was found to be very helpful, although it will be understood that this frequency relating step as well as the above described first step of secondary frequency response correlation may be carried out in any other manner permitting ready evaluation of mathematical functions The chart shown at 2 of the drawing lists along one coordinate axis the working frequencies $f$, whereas the other axis carries the values of frequencies $\varphi$ which it might be necessary to avoid. These frequencies have to be avoided if their third, fourth, fifth, etc. harmonics coincide with the desired working frequency, plotted on the other axis. Thus, for a desired working frequency $f$ of 1200 kc., the secondary or $\varphi$ frequencies 133.33, 150, 171.43, and 200 kc. must be avoided, their 9th, 8th, 7th and 6th harmonics respectively being dangerously near to the working frequency of 1200 kc. It is convenient to indicate these dangerous harmonics as shown in the drawing, where numeral 3 denotes conspicuously marked channels containing the dangerous values. The width of each of these channels is such that a horizontal line representing any working or finishing frequency $f$ will have a portion contained in the $n$th channel ($n$=2, 3, etc.) which correspond to frequencies $\varphi$ whose $n$th harmonics lie within a safe range, in the present instance for example ±40 kc. of the desired working frequency $f$. Thus, the 9th harmonic strip will extend ±40/9 kc. on the horizontal about its midpoint, the 8th harmonic strip ±40/8 kc., the 7th ±40/7 kc., etc.

To use this chart, the operator moves horizontally across the chart from the chosen $f$ frequency and notes by pairs the extremities of the clear regions such as marked 4 in the drawing. Crystals having $f$ frequencies within any of these clear regions will be usable.

The values thus obtained are then used by the operator as follows: In chart 1, a range of $x$ and $z'$ values initially indicated as preferable for the desired crystal by considerations of price, expediency and other factors, is marked off. This region is essentially a parallellogram (such as for example marked 6 in the drawing) bounded by a pair of coordinates corresponding to the selected $x$ values $x_a$, $x_b$ and a pair of curve sections corresponding to the $z'$ values. If any part of this parallellogram lies between any of the pairs of limits for $f$ as determined in the above indicated manner by the clear regions of chart 2, then it will be possible to finish the crystal with the pre-selected $x$ and $z'$ dimensions to a thickness $y'$ furnishing the desired working frequency $f$. In the drawing, the crystal plate is indicated at 10, the face dimensions obtained as above described at 11 and 12, and the thickness at 15.

If no part of the $x$, $z'$ parallellogram lies between any of the paired limits, the plate cannot be finished at the desired frequency $f$ in the desired secondary dimensions $x$, $z'$, and other $x$, $z'$ values must be considered. Once a region of dimensions free from $\varphi$ disturbance has thus been found, the probable necessary thickness $y'$ for the frequency in question is determined by the frequency constant in question. The blanks adjusted to the proper $x$ and $z'$ dimensions are lapped to near this probable thickness $y'$, whereupon they are tested for the working resonant frequency. This test gives a more accurate idea of the frequency constant which for oriented plates of this type is never really constant. If the crystal is too far off frequency, it can be returned to the lapping machine and brought within 5 kc. or less of the terminal frequency. If its activity then seems insufficiently high the plate can be narrowed slightly to correct this. Provided that the edges and corners of the crystal plate are kept as perfect as possible, no difficulty will be experienced to bring the crystal smoothly and continuously to frequency.

For example, the desired working frequency of a plate may be assumed to be 950 kc., and various engineering considerations may indicate as desirable an $x$ dimension range between 0.55'' and 0.60'' and a $z'$ dimension range between 0.575'' and 0.725''. Chart 2 gives for the primary frequency $f=950$, a series of 142–151, 165–181 and 198–226 for the harmonics of the secondary frequency $\varphi$. Chart 1 indicates a permissible $\varphi$ range from 187 to 214, and therefore it will be possible to fabricate the desired plate with $x$ and $z'$ dimension within the quadrangle bounded by the 198 abscissa, the 0.55 and 0.60 ordinates and the $z'=0.60$ curve of chart 1, the portion below the 198 abscissa being unsuitable. Assuming for example a frequency constant 66.7, the plate is now reduced as above described to the corresponding $y'$ dimension of approximately 0.07''.

It should be understood that the present disclosure is for the purpose of illustration only and that this invention includes all modifications and equivalents which fall within the scope of the appended claims.

I claim:

1. The method of fabricating a piezoelectric crystal plate of the type which has an orientation about one of the characteristic crystal axes and which is intended to furnish a given resonant working frequency determined by a primary dimension in one of said axes and unaffected by conflicting harmonic frequencies dependent upon the secondary plate dimensions in the two other axes, which method comprises the steps of experimentally establishing for series of said secondary dimensions the inter-relation of the fundamental frequency of said conflicting harmonic frequencies and said secondary dimensions for a crystal of said orientation, adjusting a crystal plate of said orientation to secondary dimensions determined by said experimentally established inter-relation as excluding such conflicting harmonics that lie within a predetermined range of desired working frequency, and then adjusting said plate to said primary dimension furnishing said working frequency.

2. The method of fabricating a piezoelectric quartz crystal plate of the AT-cut type intended to furnish a given resonant working frequency determined by the plate thickness in the direction of the mechanical derived axis and unaffected by conflicting harmonic frequencies dependent upon the plate dimensions in the electrical and derived optic axes, which method comprises the steps of experimentally establishing for series of said dimensions the inter-relation of the fundamental frequency of said conflicting harmonic frequencies and said dimensions in the electrical and derived optical axes for a crystal of said AT-cut, adjusting a crystal plate of said cut to dimensions in the electrical and optic axes determined by said experimentally established inter-relation of said dimensions so as to exclude such conflicting harmonics that lie within a predetermined range of said desired working frequency, and then reducing said plate to said thickness furnishing said working frequency.

CONSTANCE W. FRANKLIN.

REFERENCES CITED

The following references are of record in the file of this patent:

UNITED STATES PATENTS

| Number | Name | Date |
|---|---|---|
| 1,724,232 | Taylor | Aug. 13, 1929 |
| 2,064,288 | Bokovoy | Dec. 15, 1936 |
| 2,073,046 | Bokovoy | Mar. 9, 1937 |
| 2,304,760 | Gerber | Dec. 8, 1942 |
| 2,306,909 | Sykes | Dec. 29, 1942 |
| 2,440,886 | Bach | May 4, 1948 |

OTHER REFERENCES

Electronics, June 1945, pages 112–119, Predimensioning Quartz Crystal Plates, Haines, O'Neal and Robinson.